United States Patent

[11] 3,628,890

| [72] | Inventors | Edwin D. Sayre;<br>Lewis J. Stoffer, both of Cincinnati, Ohio |
|---|---|---|
| [21] | Appl. No. | 855,334 |
| [22] | Filed | Sept. 4, 1969 |
| [45] | Patented | Dec. 21, 1971 |
| [73] | Assignee | General Electric Company |

[54] COMPRESSOR BLADES
5 Claims, 1 Drawing Fig.

[52] U.S. Cl. .................................................. 416/230,
416/224, 416/226
[51] Int. Cl. .................................................. F01d 5/14
[50] Field of Search .......................................... 416/224,
226, 229, 230, 241

[56] References Cited
UNITED STATES PATENTS

| 2,868,439 | 1/1959 | Hampshire | 416/230 X |
| 2,929,755 | 3/1960 | Porter | 416/230 X |
| 3,294,366 | 12/1966 | Coplin | 416/220 |
| 3,424,434 | 1/1969 | Palfreyman et al. | 416/230 |
| 3,456,917 | 7/1969 | Palfreyman et al. | 416/230 X |

FOREIGN PATENTS

| 338,683 | 11/1930 | Great Britain | 416/224 |
| 901,075 | 7/1962 | Great Britain | 416/230 |
| 903,124 | 8/1962 | Great Britain | 416/230 |

*Primary Examiner*—Everette A. Powell, Jr.
*Attorneys*—Derek P. Lawrence, Edmund S. Lee, III, Lee H. Sachs, Frank L. Neuhauser, Oscar B. Waddell and Joseph B. Forman

ABSTRACT: An axial flow compressor rotor blade is formed by two separable components. One component is fabricated of metal and forms the leading edge portion of the cambered airfoil and the mounting tang of the blade. The other component is formed of a fiber-composite material and forms the remainder of the cambered airfoil.

3,628,890
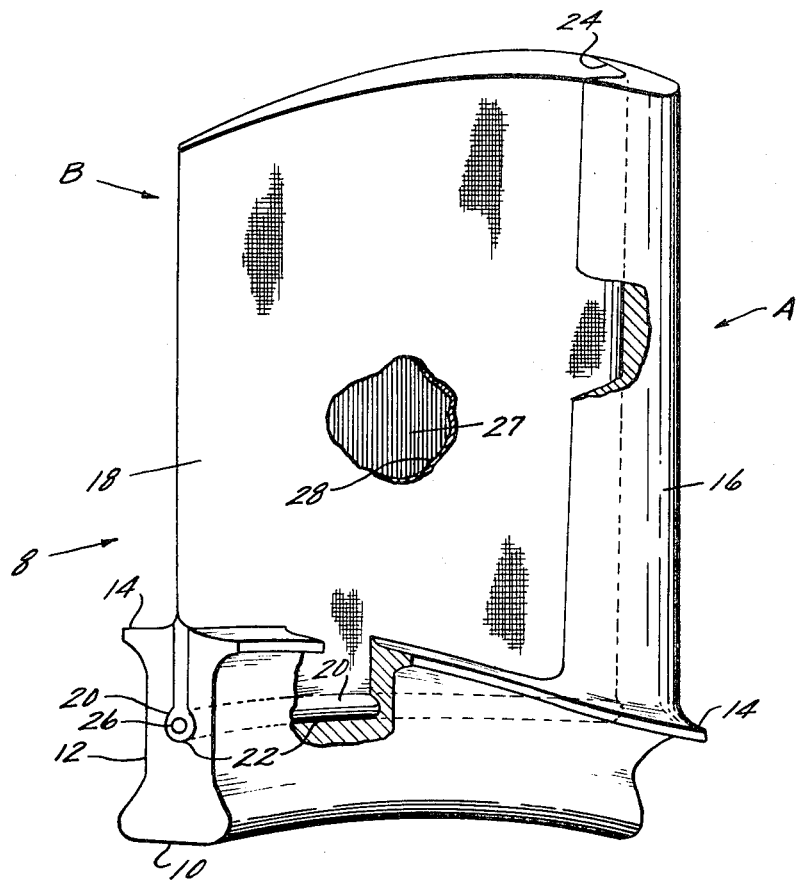
INVENTORS.
EDWIN D. SAYRE
LEWIS J. STOFFER
ATTORNEY

COMPRESSOR BLADES

The present invention relates to improvements in blades employed in turbomachinery.

Notable improvements have been made, in recent years, in producing lightweight, high-strength, high-rigidity blades formed of fiber composite materials. Such composite materials take many forms, but basically they comprise small diameter fibers or filaments having extremely high, unidirectional strength and a homogeneous matrix material bonding the fibers in a desired load-carrying relationship. A well-known composite material comprises glass fibers bonded in a cured epoxy matrix.

A primary problem in the utilization of composite blades is their vulnerability to damage from foreign objects ingested by an engine during operation. Larger objects, such as birds, can cause the blades to break. Smaller objects, such as sand or even rain, can rapidly erode the composite material.

The leading edge portion of a blade is normally subject to the greatest amount of foreign object damage and erosion. Several proposals have been made to bond a sheet metal guard to the leading edge of a composite blade. While this approach can provide protection for the fibers at the leading edge of a blade, there is a definite problem in assuring structural integrity, particularly for a rotating blade.

Accordingly, one object of the invention is to provide improved protection for the leading edge portions of a blade having a major portion formed by a fiber-composite material and, in so doing, to improve the structural integrity of the blade.

Another object of the invention is to attain the above end and, in so doing, provide flexibility in blade repair and replacement.

A further object of the invention is to additionally minimize vibrations induced in such blades during operation.

These ends are attained by a two-piece blade construction wherein one component is formed of metal and the other component is formed of a fiber composite material. The metal component provides the leading edge portion of the cambered airfoil as a structural element as well as the mounting means for the blade. The fiber composite component provides the remainder of the cambered airfoil. Preferably, these two components are joined in nonbonded relation by tang means with the leading edge of the fiber-composite component being received in a groove formed in the airfoil portion of the metal component.

In the form of a rotor blade, the metal component has a tang for joining the blade to a rotor and a rib receiving the tang of the fiber-composite component. Preferably, these tangs and the rib are formed on radii approximating the curvature of the cambered airfoil.

The above and other related objects and features of the invention will be apparent from a reading of the following description of the disclosure found in the accompanying drawing and the novelty thereof pointed out in the appended claims.

The single figure of the drawing is a perspective view, with portions broken away and in section, of a compressor blade embodying the present invention.

The illustrated blade 8 comprises two separable components A and B which, when assembled, provide the normal functions of an axial flow compressor blade.

Component A is formed of any metal normally suitable for all metal compressor blades, such as alloyed steel or titanium. This component is unitary to form an integral structural element. Component A comprises a dovetail 10, a rib 12, platforms 14 projecting outwardly from the rib and the leading edge portion 16 of the cambered airfoil blade.

Component B is formed of a fiber-composite material as described above. Component B provides the remaining portion 18 of the cambered airfoil portion of the blade and is provided at its lower end with a curved tang 20 which is received by a corresponding slot 22 in the rib 12 of component A.

Preferably, components A and B are not bonded together but are held in assembled relation by providing a tight fit between the tang 20 and the slot 22 when the leading edge of component B is fitted within a groove 24 formed in the rear face of the metal leading edge portion 16.

The tang 10 serves the normal function of mounting the blade 8 on a compressor rotor, being received by a correspondingly shaped slot in the periphery of the rotor. Preferably, the tang 10, rib 12 and tang 20 are generated on radii approximating the camber of the airfoil blade. This enables substantially all of the high centrifugal force loadings to be taken in tension by components A and B while permitting assembly of the tang 10 in a rotor slot and assembly of tang 20 in slot 22.

Tang 20 is preferably formed by wrapping lengthwise fibers 27 of the composite material around a rod 26. The outer surface of the blade portion 18 may be formed by a woven fiber fabric 28 as illustrated.

It will be readily apparent that the described blade provides a high measure of protection against erosion and other foreign object damage which would be encountered in the operation of a compressor. While the weight is increased over conventional fiber-composite blades, nonetheless significant weight advantages are obtained over metal blades and the features of increased protection and structural integrity provide overall advantages in the construction of gas turbine engines.

Further, component B can be replaced independently of component A to facilitate maintenance of the compressor.

A less apparent advantage is the nonbonded assembly of components A and B. This feature permits limited relative movement between the two components which dampens vibrations of the cambered airfoil portions of the blade. Such vibrations are well known in the compressor art, being induced by airflow over the blades. In this connection, it will be noted that the leading edge portion 18, which extends through the full height of the blade, is an independent structural element. This is opposed to sheet metal caps which have previously been employed. The chord length of the portion 18 and the depth of the groove 24 are proportioned for minimum weight, while at the same time providing the desired structural integrity and providing a substantial leading edge surface area of metal.

While the invention has been described in connection with an axial flow compressor and rotor blade, its broader aspects are also applicable to stator blades which are more commonly referenced as vanes as well as to other types of compressors.

Having thus described the invention, what is claimed as novel and desired to be secured by Letters Patent of the United States is:

1. A COMPRESSOR BLADE HAVING A CAMBERED AIRFOIL AND COMPRISING

A metal component integrally forming the blade-mounting means and the leading edge portion of the cambered airfoil as an independent structural element and a fiber-composite component forming the remainder of the cambered airfoil portion of the blade, said fiber-composite component having tang means joining it to the mounting means of the metal component and said two components being assembled in nonbonded relation.

2. A compressor blade as in claim 1 in the form of a rotor blade and in which the mounting means of the metal component comprise a tang and a rib underlying the fiber-composite component, the fiber-composite component has a tang at its inner end received by a correspondingly shaped slot in the rib of the metal component, joining the two components in nonbonded relation and the leading edge portion of the metal component has a groove receiving the upstream edge portion of the fiber-composite component.

3. A compressor blade as in claim 1 wherein the leading edge portion of the metal component has a groove receiving the upstream edge portion of the fiber-composite component.

4. A compressor blade as in claim 2 wherein the tang of the fiber-composite component is formed on a radius approximating the curvature of the cambered airfoil.

5. A compressor blade as in claim 4 wherein the tang and rib of the metal component are also formed on radii approximating the curvature of the cambered airfoil.

* * * * *